United States Patent
Zhao et al.

(10) Patent No.: US 11,276,164 B2
(45) Date of Patent: Mar. 15, 2022

(54) CLASSIFIER TRAINED WITH DATA OF DIFFERENT GRANULARITY

(71) Applicant: INTERNATIONAL BUSINESS MACHINES CORPORATION, Armonk, NY (US)

(72) Inventors: Shiwan Zhao, Beijing (CN); Xiaolu Zhang, Beijing (CN); Yong Qin, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 249 days.

(21) Appl. No.: 16/106,320

(22) Filed: Aug. 21, 2018

(65) Prior Publication Data
US 2020/0065961 A1    Feb. 27, 2020

(51) Int. Cl.
| | |
|---|---|
| G06T 7/11 | (2017.01) |
| G06K 9/62 | (2022.01) |
| G06N 5/04 | (2006.01) |
| G06T 7/00 | (2017.01) |
| G06N 3/04 | (2006.01) |
| G06N 20/00 | (2019.01) |

(52) U.S. Cl.
CPC .......... *G06T 7/0012* (2013.01); *G06K 9/6267* (2013.01); *G06N 3/04* (2013.01); *G06N 5/046* (2013.01); *G06N 20/00* (2019.01); *G06T 7/0004* (2013.01); *G06T 7/11* (2017.01); *G06T 2207/20132* (2013.01); *G06T 2207/30096* (2013.01)

(58) Field of Classification Search
None
See application file for complete search history.

(56) References Cited

U.S. PATENT DOCUMENTS

| | | | |
|---|---|---|---|
| 7,689,016 B2* | 3/2010 | Stoecker | G06T 7/155 |
| | | | 382/128 |
| 9,792,531 B2* | 10/2017 | Georgescu | A61B 5/055 |
| 10,127,442 B2* | 11/2018 | Cai | G06K 9/00483 |

(Continued)

FOREIGN PATENT DOCUMENTS

| | | |
|---|---|---|
| CN | 106097335 A | 11/2016 |
| CN | 107730489 A | 2/2018 |
| WO | 2017027475 A1 | 2/2017 |

OTHER PUBLICATIONS

X. Shen, K. Sun, S. Zhang and S. Cheng, "Lesion detection of electronic gastroscope images based on multiscale texture feature," 2012 IEEE International Conference on Signal Processing, Communication and Computing (ICSPCC 2012), 2012, pp. 756-759, doi: 10.1109/ICSPCC.2012.6335638. (Year: 2012).*

(Continued)

*Primary Examiner* — Tahmina N Ansari
(74) *Attorney, Agent, or Firm* — Tutunjian & Bitetto. P.C.; Joseph Petrokaitis

(57) ABSTRACT

A computer implemented method, computer system and computer program product are provided for data classification. According to the method, an original data is received by one or more processing units. A classification of the original data with a trained classifier is determined by one or more processing units, wherein the classifier is trained by a labeled data of different granularity, and the labeled data include at least one defect object.

19 Claims, 5 Drawing Sheets

(56) References Cited

U.S. PATENT DOCUMENTS

| | | | | |
|---|---|---|---|---|
| 2006/0269111 | A1* | 11/2006 | Stoecker | G16H 50/20 |
| | | | | 382/128 |
| 2012/0316421 | A1* | 12/2012 | Kumar | A61B 1/041 |
| | | | | 600/407 |
| 2015/0347508 | A1* | 12/2015 | Lang | G06F 16/24542 |
| | | | | 707/718 |
| 2016/0063734 | A1* | 3/2016 | Divakaran | G06K 9/4642 |
| | | | | 382/110 |
| 2017/0116497 | A1* | 4/2017 | Georgescu | G16H 50/70 |
| 2017/0357852 | A1* | 12/2017 | Cai | G06K 9/6215 |
| 2019/0244337 | A1* | 8/2019 | Niculescu-Mizil | G06T 7/0004 |
| 2020/0065961 | A1* | 2/2020 | Zhao | G06T 7/0004 |

OTHER PUBLICATIONS

Li, Baopu, et al. "Automatic polyp detection for wireless capsule endoscopy images" Expert Systems with Applications, Sep. 2012, pp. 10952-10958, 39, No. 12.

Chen, Yingju, et al. "Ulcer detection in wireless capsule endoscopy video." Proceedings of the 20th ACM International conference on Multimedia, Oct. 2012, pp. 1181-1184.

Krizhevsky, Alex, et al. "Imagenet classification with deep convolutional neural networks" Advances in neural information processing systems, 2012, pp. 1097-1105.

Zheng, Yuanpu, et al. "Detection of lesions during capsule endoscopy: physician performance is disappointing." The American journal of gastroenterology, Apr. 2012, pp. 554-560, 107, 4.

Yeh, Jinn-Yi, et al. "Bleeding and ulcer detection using wireless capsule endoscopy images." Journal of Software Engineering and Applications, May 2014, pp. 422-432, 7, No. 05.

Zhang, Su, et al. "Abnormal region detection in gastroscopic images by combining classifiers on neighboring patches." Machine Learning and Cybernetics, 2009 International Conference on, Jul. 2009, pp. 2374-2379, 4.

Siegel, Rebecca L., et al. "Cancer Statistics, 2017." CA: a cancer journal for clinicians, Jan. 2017, pp. 1-30, 67, 1.

Bengio, Yoshua, et al. "Curriculum learning." Proceedings of the 26th annual international conference on machine learning, Jun. 2009, pp. 41-48.

Eid, Alexis, et al. "A curvelet-based lacunarity approach for ulcer detection from wireless capsule endoscopy images." Computer-Based Medical Systems (CBMS), 2013 IEEE 26th International Symposium on, Jun. 2013, pp. 273-278.

He, Kaiming, et al. "Deep residual learning for image recognition." Proceedings of the IEEE conference on computer vision and pattern recognition, 2016, pp. 770-778.

Karargyris, Alexandros, et al. "Identification of ulcers in wireless capsule endoscopy videos." Biomedical Imaging: From Nano to Macro, 2009. ISBI'09. IEEE International Symposium on, Jun. 2009, pp. 554-557.

Li, Zhaoshen, et al. "Epidemiology of peptic ulcer disease: endoscopic results of the systematic investigation of gastrointestinal disease in China." The American journal of gastroenterology, Dec. 2010, pp. 2570-2577, 105, No. 12.

Liao, Zhaun, et al. "Accuracy of magnetically controlled capsule endoscopy, compared with conventional gastroscopy, in detection of gastric diseases." Clinical Gastroenterology and Hepatology, Sep. 2016, pp. 1266-1273, 14, No. 9.

Li, Baopu, et al. "Texture analysis for ulcer detection in capsule endoscopy images." Image and Vision computing, Aug. 2009, pp. 1336-1342, 27, No. 9.

* cited by examiner

CLASSIFIER TRAINED WITH DATA OF DIFFERENT GRANULARITY

BACKGROUND

Technical Field

The present invention relates to data processing, and more specifically, to data classification with a classifier trained with data of different granularity.

Description of the Related Art

More and more data are obtained from the fields of semiconductor, medicine, Micro Electro Mechanical System (MEMS), metal defect detecting, textile printing, image processing, etc. One problem in big data is to determine the classification of the data.

For instance, in medical field, gastrointestinal (GI) system cancer has become a major threat to human lives. The early diagnosis and treatment of GI diseases are fundamental in reducing the death rate of GI system cancer. However, many GI diseases do not have specific symptoms. Although conventional gastroscopy check provides a standard of diagnosis, the high requirement of equipment and the low acceptance degree in population (mainly caused by the pain brought to the patients by this check) limit its application in screening GI diseases. In comparison, the Wireless Capsule Endoscopy (WCE) offers a low-risk, non-invasive visual inspection of the patient's digestive tract compared to the traditional endoscopy. It has been recommended as a preferred examination tool to be used during a routine examination.

One of the main challenges in the WCE-based examinations is the sparsity of useful information. For each patient, around 55,000 pictures are taken in the patient's digestive track, but the evidences of abnormalities (e.g., Crohns disease, ulcers, blood-based abnormalities and polyps, etc.) only appear in a few of them. It takes a physician several hours to finish the visual analysis, yet the performance is far from satisfaction.

SUMMARY

This summary is provided to introduce a selection of concepts in a simplified form that are further described herein in the detailed description. This summary is not intended to identify key factors or essential features of the claimed subject matter, nor is it intended to be used to limit the scope of the claimed subject matter.

According to one embodiment of the present invention, a computer-implemented method is provided. According to the method, an original data is received by one or more processing units. A classification of the original data is determined with a trained classifier by one or more processing units, wherein the classifier is trained by a labeled data of different granularity, and the labeled data includes at least one defect object.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

In other illustrative embodiments, a computer program product including a computer useable or readable medium having a computer readable program is provided. The computer readable program, when executed on a computing device, causes the computing device to perform various ones of, and combinations of, the operations outlined above with regard to the method illustrative embodiment.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
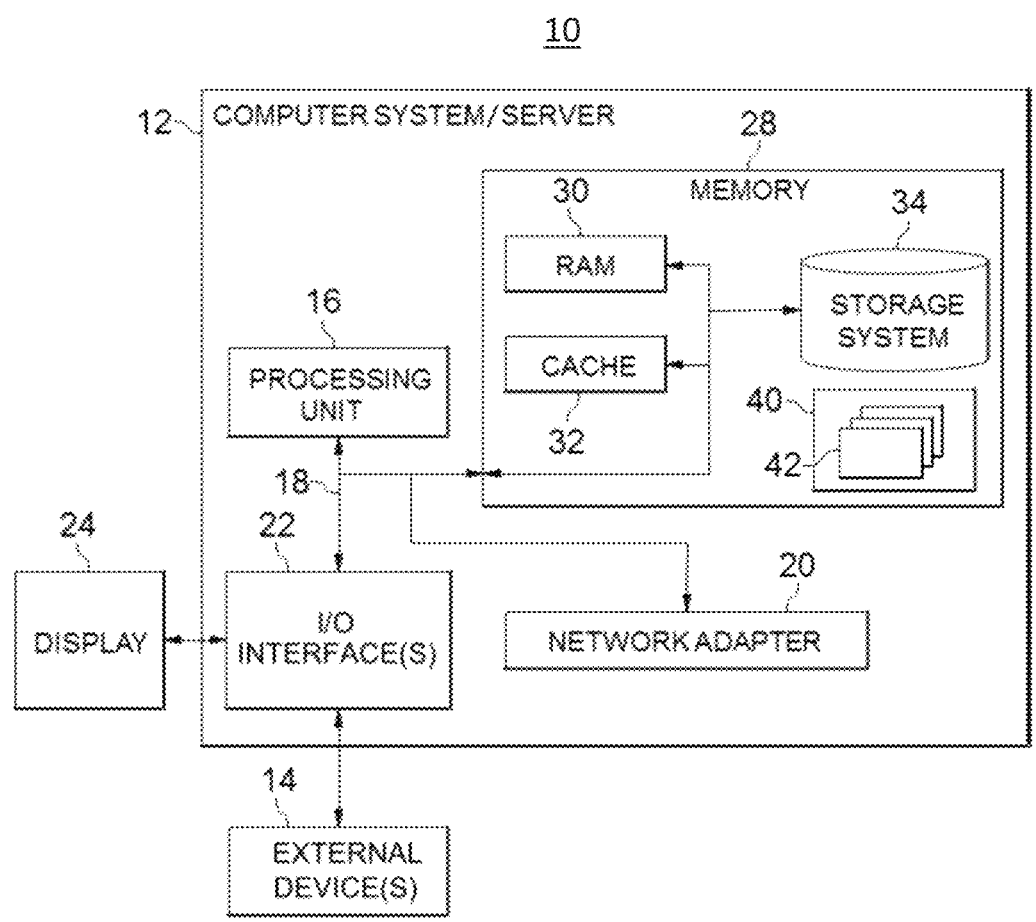
FIG. 1 depicts a cloud computing node according to an embodiment of the present invention.

Some preferable embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
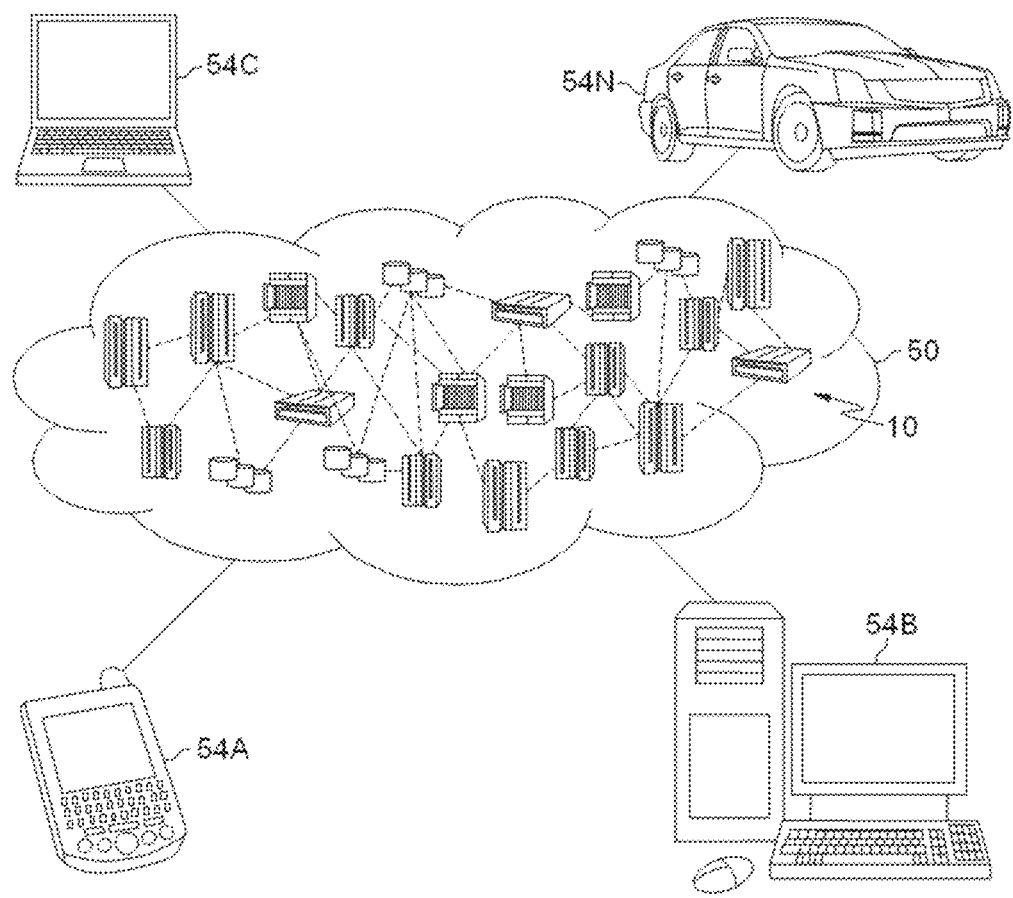
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
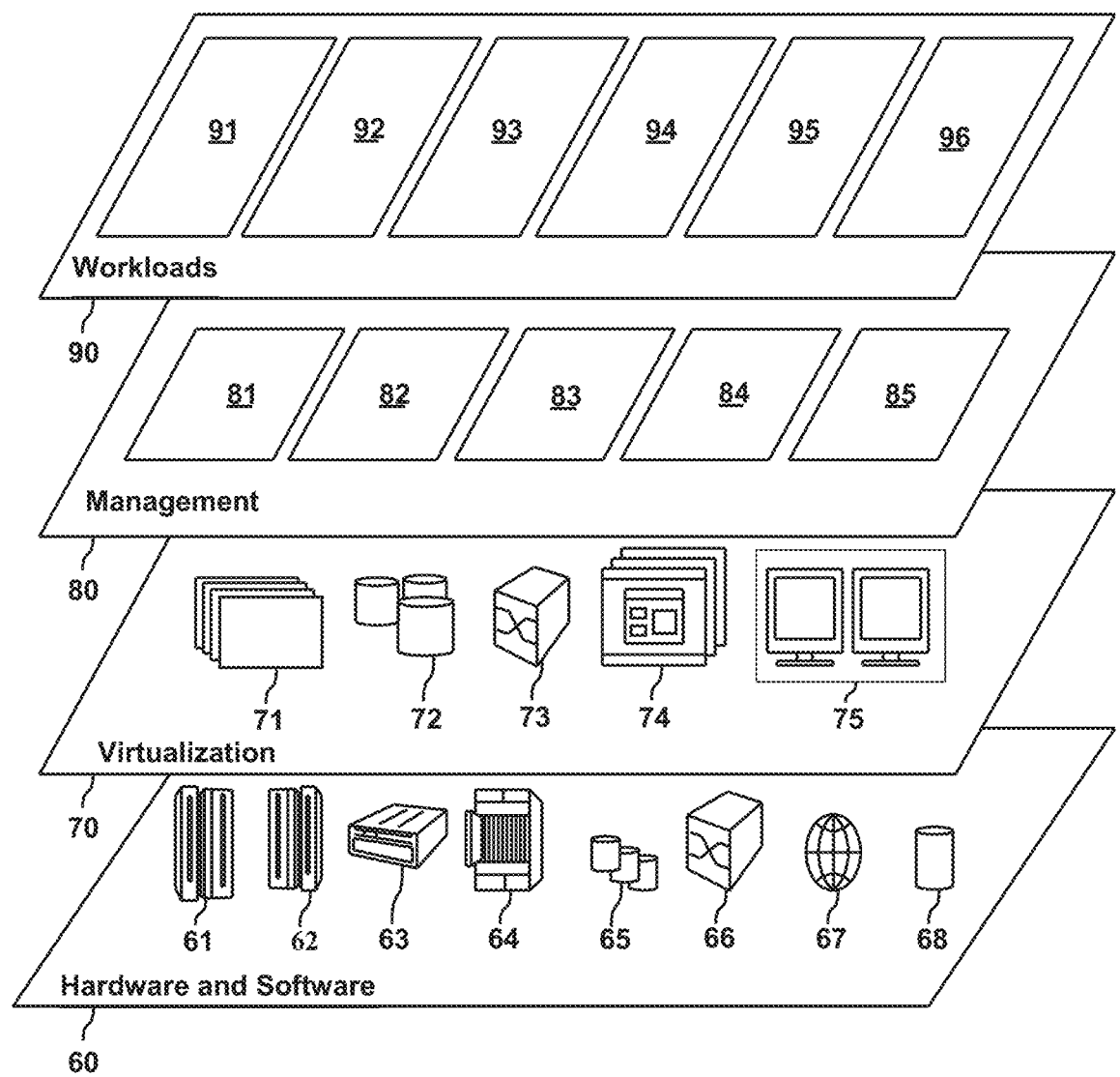
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data classification 96 with a classifier trained with a labeled data of different granularity.

As described above, one challenge in the application of big data is how to classify the data. In the medical field, this raises the importance in designing an AI (artificial intelligence) system to reduce the burden on the physicians and the cost of the WCE-based examinations, and improve the accuracy of diagnosis. The topic of automatically inspecting WCE data has attracted a lot of attentions in the conventional image processing area. Recently, the fast development of deep learning techniques, especially convolutional neural networks (CNN), has brought a new opportunity in boosting the performance of analyzing WCE data. Analyzing WCE data is only an example for a better understanding of the present invention and thus shall not be construed to limit the scope of the invention. For example, a person skilled in the art can leverage the methods/systems of this invention in any other proper field to solve the problem of data classification, such as the fields of semiconductor, Micro Electro Mechanical System (MEMS), metal defect detecting, textile printing, image processing etc.

Figure 4:
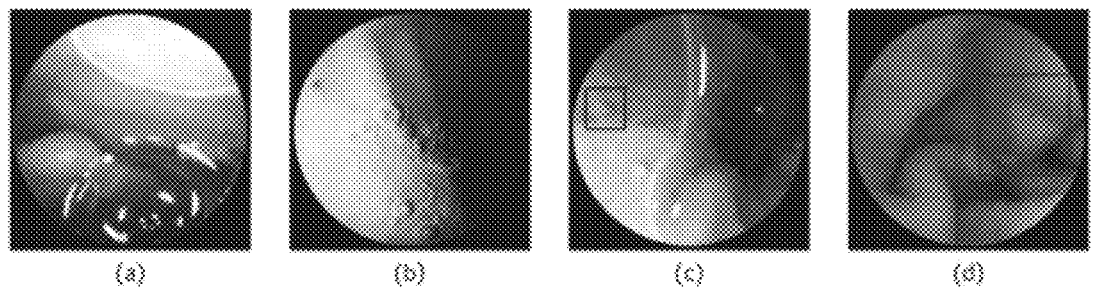
FIG. 4 shows four images captured by WCE according to an embodiment of the present invention.

In an embodiment of the present invention, gastric ulcers, one of the most common GI diseases that can be detected in WCE images, are considered. In an embodiment, a large dataset with more than 3 million images is collected, but within the dataset, only 1% of the images were annotated with lesion areas around the ulcer. As shown in FIG. 4, four images are captured by WCE. the image (a) and the image (b) do not contain gastric ulcers, while the image (c) and the image (d) contain ulcers of different sizes (marked by a rectangle). The size of the lesion area may vary, but most lesions are very small. There are, in general, two ways of learning from these data by training: training a classifier on small local patches with the lesion and training a classifier on global images. Both of the ways have their advantages and disadvantages. Training a classifier on small local patches with the lesion is sensitive to small lesions, but can also produce a lot of false alarms. Training a classifier on global images runs much faster, but suffers from a relatively low classification accuracy.

To take advantage of the benefits and avoid drawbacks, an embodiment of the present invention utilizes an infinite curriculum learning approach. An embodiment of the present invention includes ranking the training data according to their learning difficulties, training a classifier first on simple patches, and then adapting it gradually to the entire images. The term "infinite" means the training data may be infinite by cropping the labeled data. Hereinafter, some embodiments of the present invention will be explained in detail to help understand the present invention.

Figure 5:
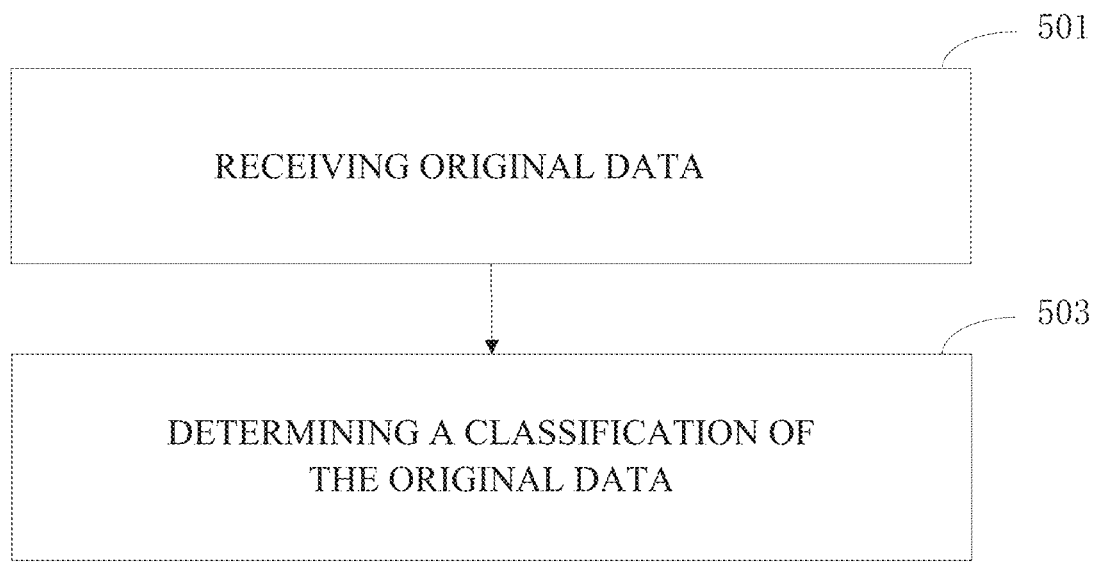
FIG. 5 shows a method of original data classification according to an embodiment of the present invention.

Now referring to FIG. 5, which shows a method of data classification according to one embodiment of the present invention. For a better understanding of the present invention, an embodiment will be described in the following paragraphs with further reference to FIG. 6, which depicts a classifier training framework 600 according to an embodiment of the present invention. With the framework 600, the data classification processes of applying the classifier 608 based on medical images are further described. Although medical image analysis and the framework 600 are used to explain the data classification processes, it should be clear that the following description is merely for the purpose of simplifying illustration and will not adversely limit the scope of the invention.

As shown in FIG. 5, at block 501, an original data is received, by one or more processing units. The original data may be images. Of course, the images are just examples, and any other suitable data structure can be used in the present invention. The original data may be from any suitable field such as the fields of semiconductor, medical, Micro Electro Mechanical System (MEMS), metal defect detecting, textile printing, image processing etc. Actually, images from any suitable field can be processed according to embodiments of the present invention in order to classify the images.

At block 503, a classification of the original data is determined with the trained classifier 608 by one or more processing units, wherein the classifier 608 is trained by labeled data of different granularity 603, and the labeled data 603 includes at least one defect object 610. The classifier 608 may be any type of convolutional neural networks (CNN) such as VGG Net, ResNet, DenseNet, etc. The original data and the labeled data may be medical images, or any other type of proper data. For example, the labeled data in the form of images about semiconductor (e.g., the images of wafer) may be different from medical images. The labeled data may be a full-size image 601, and they may be patches 603 cropped from the full-size image 601. The labeled data of different granularity may be images with different scales.

Figure 6:
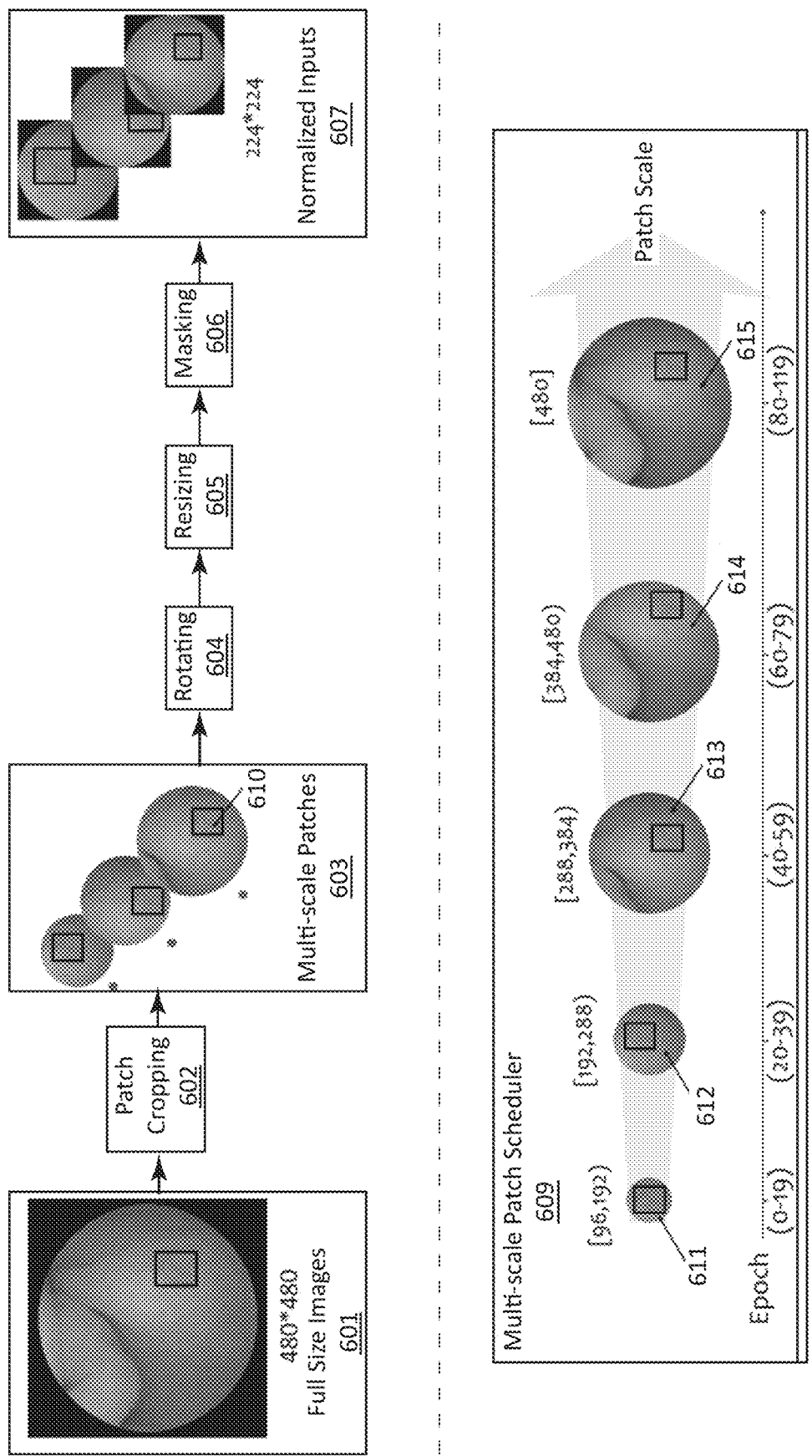
FIG. 6 shows an exemplary framework of training a classifier according to an embodiment of the present invention.

As shown in FIG. 6, the Multi-scale Patch Scheduler 609 may crop the full-size image 601 according to different scales. Theoretically, the Multi-scale Patch Scheduler 609 can crop the full-size image 601 at any scale, and the patches may be infinite. The term "defect object" may be defined as an abnormal object according to a set of criterial indices in a suitable field, for example, the defect object may be selected from: a defect part of semiconductor device; a lesion within a biological tissue; a defect part of Micro Electro Mechanical System (MEMS); a defect area within a metal; and a stain in a textile printing material or image. FIG. 6 shows a gastric ulcer area marked in a rectangle as one defect object 610. The labeled data 603 may include positive labeled data or negative labeled data, the positive labeled data includes a defect object 610, the negative labeled data doesn't include any defect object 610. FIG. 6 only shows the positive labeled patches with at least one defect object 610 marked in a rectangle. The classifier 608 is trained by the labeled data of different granularity in the order of the granularity. Furthermore, the classifier 608 is trained by the labeled data of different granularity from a fine granularity to a coarse granularity. The labeled data of different granularity have data with at least five levels of granularity (represented by patches 611, 612, 613, 614 and 615) according to their fineness. When the data are images, the fine granularity means the small scale and the coarse granularity means large scale. How to train the classifier will be explained in detail later. The classification of the original data is very useful, and the classification may be represented as a label(s). For instance, the classification label may show whether the medical image is normal or not in the medical field, or the classification label may show whether the wafer has defect part or not, etc., which will save much labor of the professional and save much cost, and also avoid many human mistakes.

For a better understanding of the present invention, embodiments of the present invention will be described in the following with reference to FIG. 6. With the framework 600, the training of the classifier 608 based on medical images is further described. Although medical images and the framework 600 are used to explain the training processes, it should be clear to a person skilled in the art that the following description is merely for the purpose of simplifying illustration and will not adversely limit the scope of the invention.

Training the Classifier 608

Mathematically, the labeled data for training the classifier 608 may be a finite set $S=\{(X_n,y_n,R_n)\}_{n=1}^{N}$, where N is the number of samples. For each n (n=1 to N), for example, $X_n$ may be a full size medical labeled image 601, which may be mathematically presented as a 480×480×3 matrix (where the last dimension indicates the RGB channels) and $y_n \in \{0, 1\}$ is the label, e.g., whether a defect object 610 (e.g., gastric ulcers) can be observed from $X_n$. For instance, if $y_n=1$, e.g., the defect objects are detected, then $R_n$ contains at least one bounding rectangle box, each of which covers a lesion area which includes the defect objects, otherwise $R_n=\emptyset$, or vice versa. The goal is to design a function $\hat{y}=f(X; \theta)$ to classify each original image X, where θ is the model parameters. In the context of deep learning, $f(\bullet; \theta)$ is a hierarchical neural network, and θ is the weights, mostly related to the convolutional layers.

More specifically, a 101-layer deep residual network may be implemented as the function $f(\bullet; \theta)$ of the classifier 608. This network takes a 224×224 input image, uses one 7×7 convolutional layer and 33 channel bottleneck modules (99 layers in total) to down-sample the image to 7×7, and finally applies one fully-connected layer for classification. There is a residual connection between the input and output of each bottleneck, which accelerates convergence and enables us to train it from scratch. It's appreciated that the 101-layer deep residual network is used to explain the data classification processes as an example. It should be clear to a person skilled in the art that the following description is merely for the purpose of simplifying illustration and will not adversely limit the scope of the invention.

There are still two major challenges. First, due to the way of data annotation, the number of positive training samples is very limited. Second, when the capsule of WCE is moving within the stomach, the camera may capture the gastric ulcer in various viewpoints, resulting a large variation in the scale and position of the lesion area. Most gastric ulcers annotated by the physicians are of a small size, e.g., 85% of the annotated lesions are smaller than ⅕ of the entire image (e.g., the image (c) in FIG. 4). However, detecting a large lesion (e.g., the image (d) in FIG. 4) is also important in diagnosis. These difficulties motivated a design of a method that first learns from small patches such as the patches 611, 612 shown in FIG. 6, and then gradually adjusts itself to the entire image 601 shown in FIG. 6.

The training process is illustrated in FIG. 6. In this embodiment, the labeled data of different granularity are patches randomly cropped from a labeled original data (e.g., the full-size image 601) according to different scales. When randomly cropping the patch, the positive patch will contain at least one defect object (e.g., gastric ulcer), and the negative patch will not contain any defect object. In order to simplify the operation, the negative patch will be cropped from the images labeled as normal (without any lesion). The Multi-scale Patch Scheduler 609 may schedule the patch scale as [96, 192), [192, 288), [288, 384), [384, 480), 480. A total of 120 epochs are performed. The total of 120 epochs is only an example. Theoretically, the number of epochs may be [2, ∞). The classifier 608 is trained by the labeled data in the order of the granularity. Particularly, the classifier 608 is trained by the labeled data from a fine granularity to a coarse granularity. That is, the five subsets $S_1$ through $S_5$ are used orderly to train the classifier 608. Except for $S_5$ which is used in the last 40 epochs, all others are used in 20 epochs respectively as 0~19, 20-39, 40-59 and 60-79. The classifier 608 is trained on the full images 615 (or 601) for a longer stage (e.g., 80-119) to improve the stability. Note that all subsets are infinite, so the patches are sampled in an online manner. Each of the multi-scale patches needs to be preprocessed before training the classifier 608. The patch is randomly rotated (by block 604) by $\alpha \in [0°, 360°)$ (data augmentation), and/or resized (by block 605) into 224×224, and/or masked (by block 606). The masking (by block 606) means all pixels of the patch are within a minimal square that covers the patch and the area of the square outside of the patch is set to black. The masking is special for the images obtained from WCE, because the images are circular views and the input image requested by the classifier is a 224×224 square. Finally, the preprocessed patches are fed into the CNN to train the classifier 608 epoch by epoch.

The exemplary results of embodiments will be introduced. A dataset of Wireless Capsule Endoscopy (WCE) images for gastric ulcer classification is collected. The dataset is collected from 1,838 patients by removing any personal sensitive information. Among the patients, 1,499 patients have at least one image annotated with gastric ulcers. On all ulcer images, physicians have manually labeled a bounding rectangle for each lesion area. Only those regions containing enough information to make decisions are annotated, which implies that part of the ulcer images were not annotated. The set of positive samples contains 33,943 images labeled with gastric ulcers in different scales from the 1,499 full size images which have at least one image annotated with gastric ulcers, and the negative set contains all 766,229 images from 339 non-ulcer patients. The patients are randomly divided into 4 folds (e.g., 0, 1, 2, 3) of approximately the same size, and standard cross-validation is performed. In all folds, there are roughly the same number of positive and negative cases. The average classification accuracy is reported, as well as the area under the ROC curve (AUC). In statistics, a ROC curve is a receiver operating characteristic curve, e.g., a ROC curve is a graphical plot that illustrates the diagnostic ability of a binary classifier system as its discrimination threshold is varied. The area under the curve (often referred to as AUC) is equal to the probability that a classifier will rank a randomly chosen positive instance to be higher than a randomly chosen negative one (assuming 'positive' ranks higher than 'negative').

An embodiment of the present invention is denoted by CURRIC_5, e.g., the 5-stage (e.g., 120 epochs) curriculum learning approach described above. To verify the effectiveness of the embodiment of the present invention, two other traditional learning strategies with the same number of epochs, learning rates, etc., are considered. The first one is named RANDOM, which samples a patch of a random scale in [96, 480] throughout the entire training process. The second one, named FULL, instead fixes the patch scale to be 480. RANDOM and FULL simply use one training stage without taking the benefits of curriculum learning. RANDOM, FULL and CURRIC_5 all use the same classifier model such as 101-layer deep residual network or other CNN, the only difference is the training process.

Results are summarized in Table 1 below. Table 1 shows the classification accuracy (%) and area-under-curve (AUC, %) values for each fold and with respect to different learning strategies. The column of "AVG" contains average value, each row in the column of "AVG" contains an average value. F #0 means uses the fold 0 as the test fold and the fold 1, 2 and 3 as training fold, F #1, F #2 and F #3 have similar meanings. According to Table 1, the CURRIC_5 approach achieves the highest overall performance, e.g., an 87.02% classification accuracy and a 93.83% AUC value. Both numbers are significantly higher than FULL (e.g., 13.41% relative classification error drop), a direct baseline indicating the effectiveness of curriculum learning. In contrast, the RANDOM approach produces much lower (yet unstable among different epochs) accuracies using completely random sampling. This is partly because the training process does not align with the final goal. The advantage of CURRIC 5 over RANDOM suggests that curriculum learning is an effective way of controlling random data distributions in the training process.

TABLE 1

| Approach | Classification Accuracy (%) | | | | | AUC Value (%) | | | | |
| --- | --- | --- | --- | --- | --- | --- | --- | --- | --- | --- |
| | F #0 | F #1 | F #2 | F #3 | AVG | F #0 | F #1 | F #2 | F #3 | AVG |
| RANDOM | 83.79 | 83.65 | 82.32 | 82.51 | 83.07 | 92.46 | 92.21 | 92.38 | 90.35 | 91.85 |
| FULL | 85.51 | 84.23 | 86.74 | 83.55 | 85.01 | 93.36 | 91.28 | 93.62 | 90.87 | 92.28 |
| CURRIC-5 | 87.05 | 86.07 | 88.83 | 86.12 | 87.02 | 94.02 | 92.81 | 95.33 | 93.17 | 93.83 |

One embodiment of the present invention is to apply one method of the present invention to gastric ulcer screening. The physician first checks all high-confidence images identified by one embodiment of the present invention. If no ulcers are detected, the physician turns to check the medium-confidence images identified by one embodiment of the present invention. If still nothing suspicious is found, this patient is considered free of gastric ulcers. One embodiment of the present invention reduces the number of images to check for each patient from roughly 3,000 to 60-300, which largely saves time for a physician to screen gastric ulcers. The average time for the system of an embodiment of the present invention to process 3,000 images does not exceed 40 seconds.

It should be pointed out that in the above embodiments of the present invention are described with medical data, however, it is only for a better understanding of the present invention thus will not adversely limit the scope of the invention. For example, a person skilled in the art could leverage the methods of this invention to any suitable field, such as the fields of semiconductor, medicine, Micro Electro Mechanical System (MEMS), metal defect detecting, textile printing, image processing etc., it will not be discussed in detail for the purpose of simplifying illustration.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter condition, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by one or more hardware processors, an original data; and
   determining, by the one or more hardware processors, a classification of the original data with a trained classifier,
   wherein the classifier is trained by labeled data, which includes at least one defect object that is represented at a plurality of different size scales, in an order of granularity, performed over multiple epochs, with full images taking a longer stage of epochs than other size scales to improve stability.

2. The method of claim 1, wherein the classifier is a convolutional neural networks (CNN).

3. The method of claim 1, wherein the original data and the labeled data are images, and the at least one defect object is selected from: a defect part of a semiconductor device, a lesion within a biological tissue, a defect part of a Micro Electro Mechanical System (MEMS), and a defect area within a metal, and a stain in a textile printing material or image.

4. The method of claim 1, wherein the labeled data of different size scales are labeled images with differing numbers of pixels.

5. The method of claim 1, wherein the labeled data of different size scales are patches randomly cropped from labeled original data according to different scales.

6. The method of claim 1, wherein training in the order of the granularity is from a fine granularity to a coarse granularity.

7. The method of claim 1, wherein the labeled data of different size scales includes data of at least five levels of granularity according to their fineness.

8. The method of claim 1, wherein the labeled data of different size scales has been preprocessed by at least one of: rotating; resizing; or masking.

9. The method of claim 1, wherein the at least one defect object is a gastric ulcer.

10. A computer system, comprising:
    a processor;
    a computer-readable memory coupled to the processor, the memory comprising instructions that when executed by the processor perform actions of:
    receiving an original data;
    determining a classification of the original data with a trained classifier,
    wherein the classifier is trained by labeled data, which includes at least one defect object that is represented at a plurality of different size scales, in an order of granularity, performed over multiple epochs, with full images taking a longer stage of epochs than other size scales to improve stability.

11. The system of claim 10, wherein the original data and the labeled data are images, and the at least one defect object is selected from: a defect part of a semiconductor device, a lesion within a biological tissue, a defect part of a Micro Electro Mechanical System (MEMS), a defect area within a metal, and a stain in a textile printing material or image.

12. The system of claim 10, wherein the labeled data of different size scales are labeled images with differing numbers of pixels.

13. The system of claim 10, wherein the labeled data of different size scales are patches randomly cropped from a labeled original data according to different scales.

14. The system of claim 10, wherein the classifier is trained with the labeled data of different size scales in order from a fine granularity to a coarse granularity.

15. A computer program product, comprising a computer readable storage medium having program instructions embodied therewith, the program instructions executable by a processor to cause the processor to:
    receiving an original data;
    determining a classification of the original data with a trained classifier,
    wherein the classifier is trained by labeled data, which includes at least one defect object that is represented at a plurality of different size scales, in an order of granularity, performed over multiple epochs, with full images taking a longer stage of epochs than other size scales to improve stability, and the labeled data include at least one defect object.

16. The product of claim 15, wherein the original data and the labeled data are images, and the at least one defect object is selected from: a defect part of a semiconductor device, a lesion within a biological tissue, a defect part of a Micro Electro Mechanical System (MEMS), a defect area within a metal, and a stain in a textile printing material or image.

17. The product of claim 15, wherein the labeled data of different size scales are labeled images with differing numbers of pixels.

18. The product of claim 15, wherein the labeled data of different size scales are patches randomly cropped from labeled original data according to different scales.

19. The product of claim 15, wherein the classifier is trained with the labeled data of different size scales in order from a fine granularity to a coarse granularity.

* * * * *